United States Patent [19]

Muschiatti et al.

[11] Patent Number: 5,391,582
[45] Date of Patent: Feb. 21, 1995

[54] POLY(ETHYLENE TEREPHTHALATE) FOAMS COMPRISING RECYCLED PLASTIC AND METHODS RELATING THERETO

[75] Inventors: Lawrence C. Muschiatti, Wilmington, Del.; Benjamin A. Smillie, Kingston, Canada

[73] Assignee: E. I. Du Pont de Nemours and Company, Wilmington, Del.

[21] Appl. No.: 230,029

[22] Filed: Apr. 19, 1994

[51] Int. Cl.$^6$ .............................................. C08J 9/12
[52] U.S. Cl. ........................................ 521/81; 521/48; 521/79; 521/138; 521/182

[58] Field of Search ............... 521/182, 138, 79, 81, 521/48

[56] References Cited

U.S. PATENT DOCUMENTS 5,000,991  3/1991  Hayashi et al. ................. 521/138
5,310,799  5/1994  Carson ............................ 521/138

*Primary Examiner*—Morton Foelak

[57] ABSTRACT

Blends of branched poly(ethylene terephthalate) ("PET") polymer and recycled plastics can be foamed to produce closed cell structures with advantageous densities, cell sizes, cell size distributions, mechanical properties and thermal properties.

3 Claims, No Drawings

POLY(ETHYLENE TEREPHTHALATE) FOAMS COMPRISING RECYCLED PLASTIC AND METHODS RELATING THERETO

FIELD OF THE INVENTION

The present invention relates generally to blends of recycled plastics and branched poly(ethylene terephthalate) ("PET") polymer resins which can be foamed to produce closed cell structures with advantageous densities, cell sizes, cell size distributions, mechanical properties and thermal properties.

BACKGROUND OF THE INVENTION

Conventional polyethylene terephthalate ("PET") resins generally have poor melt strength. Hence, molten PET tends to quickly collapse when foamed. Conventionally foamed PET can also generally have poor mechanical properties, due to broad differences in cells sizes, cell wall thicknesses and the like. Furthermore, conventional chlorinated fluorocarbon foaming agents are problematic, since they are generally deemed harmful to the environment. New foaming agents have been developed, but can be problematic for a variety of reasons.

Industrial and/or post-consumer polyester recycled resins are generally in more than abundant supply and such "waste" polyester is often landfilled, since a sufficiently large market for recylced polyester plastics has not been realized. This is problematic, since landfills are expensive and finite in their capacity to receive refuse. Furthermore, the melt strength and viscosity of post consumer and industrial recycle polyester resins are generally too low to produce adequate foamed structures with practical density reductions using conventional foam technology.

The present invention is directed to a new, economical use of industrial or post-consumer polyester waste and to new, economical and useful foams which comprise recycled polyester.

SUMMARY OF THE PRESENT INVENTION

It has been found that blends of recycle polyester resin with certain branched polyester resins provide sufficient melt strenght and viscosity to produce closed cell foams with good physical properties at practical density reductions. Low density closed cell foams can be produced from blends containing up to about 25% recycle polyester resin.

It has also been found that the percentage of recycle resin in the blend can be increased to about 75% if common chain extenders or crosslinking agents are incorporated in the recycle polyester, preferrably melt blended prior to incorporating the branched polyester.

The present invention is directed to foamed PET blends comprising branched and recycled polyester. Critical to the present invention is that at least 25% by weight of the blend be a branched PET. The PET branching agents of the present invention have a functionality of greater than 2, more preferably in the range of about of 3–6 and a molecular weight of from about 50–5000. The modified PET compositions of the present invention will preferrably have an intrinsic viscosity (I.V.) in the range of from about 0.65 deciliters per gram (dl/g) to about 1.4 dl/g. The most preferred I.V. range is from about 0.9 to about 1.1 dl/g.

The most preferred branching agent functionality is anhydride, although carboxylic acid and alcohol functional groups would also be acceptable in certain embodiments of the present invention. The most preferred branching agent is trimellitic anhydride or derivations thereof.

Optionally, the blended resins can also comprise a crystallization promoter (sometimes also referred to as crystallization "nucleating agents"). The crystallization promoter is optional, because oftentimes crystallization is not desired or the rate of crystallization without a promoter is sufficient. However, for certain foam applications, the advantages of a high rate of crystallization may call for the use of a conventional crystallization promoter.

In other embodiments of the present invention, the foam melt fabrication process of the present invention is directed to the use of environmentally friendly blowing agents, such as hydrofluorocarbons, nitrogen, carbon dioxide, fluorocarbon, and noble (or otherwise inert) gases. In other embodiments of the present invention, the foam melt fabrication process is directed to the production of closed cell foams with relatively low densities, small closed cells, and narrow cell size distribution.

DETAILED DESCRIPTION OF THE PREFERRED EMBODIMENT AND BEST MODE

Introduction

The present invention is directed to foamed blends of branched PET and recycled polyester and methods of manufacture. The resins of the present invention will be discussed first, and thereafter, the foaming process of the present invention will also be discussed.

Branched PET Component

The branched poly(ethylene terephthalate) ("PET") component of the resins of the present invention are preferably prepared from terephthalic acid (or diesters of terephthalic acid) and ethylene glycol. The PET can be modified by also incorporating diacids other than terephthalic acid or by incorporating glycols other than ethylene glycol.

For example, isopthalic acid or naphthalene dicarboxylic acid (or their respective diesters) can be used as part of the diacid component. Also, the ethylene glycol component can also contain other diols, preferably containing from about 3 to about 8 carbon atoms. Preferably, the number of diacids and diols other than terephthalic acid and ethylene glycol (respectively) is 0–5 percent of the total number of equivalents of monomer.

The PET compositions of the present invention are further modified with a branching agent having a functionality of greater than 2, more preferably in the range of about 3 to 6. The branching agent should be present in a concentration of about 1.5 to about 6 equivalents per 100 moles of diacid (or ester equivalent thereof).

The branching agent preferably has a molecular weight of about 50–5000, more preferably, 92–3000 and a functionality of about 3–6. In more detail, the branching agent may be a polyol having 3–6 hydroxyl groups, a polycarboxylic acid having 3 or 4 carboxyl groups or a hydroxy acid having a total of 3–6 hydroxyl and carboxyl groups.

Representative polyols that function as branching agents according to the present invention include glycerol, trimethylol propane, pentaerythritol, 1,2,6-hexanetriol, sorbital, 1,1,4,4-tetrakis(hydroxymethyl)cyclohexane, tris(2-hydroxyethyl)isocyanurate, and dipentaerythritol. In addition to those low molecular weight polyols, higher molecular weight polyols (MW 400–3000), particularly triols derived by condensing alkylene oxides having 2–3 carbons, e.g., ethylene oxide, propylene oxide with polyol initiators, which have 3–6 carbons, e.g., glycerol, can also be used as branching agents. Representative polycarboxylic acids that can be used as branching agents include hemimellitic or trimellitic acid, trimesic acid, pyromellitic acid, 1, 1,2,2-ethanetetracarboxylic acid, 1,1,2-ethanetricarboxylic acid, 1,3,5-pentanetricarboxylic acid, and 1,2,3,4-cyclopentanetetracarboxylic acid.

Although the acids may be used as such, preferably they are used in the form of their lower alkyl esters or (most preferably) as their cyclic anhydrides in those instances were cyclic anhydrides can be formed.

Representative hydroxy acids that can be used as branching agents include malic acid, citric acid, tartaric acid, 3-hydroxyglutaric acid, mucic acid, trihydroxyglutaric acid, and 4-(beta-hydroxyethyl)-phthalic acid.

Especially preferred branching agents include trimellitic anhydride, trimesic acid, oxypropylated triols (optionally capped with ethylene oxide) having molecular weight of 400–3000 and tris(2-hydroxyethyl) isocyanurate.

Recycled Polyester

The recycled polyester component of the resins of the present invention can be virtually any "waste" industrial or post-consumer polyester. Preferably, the recycled polyester comprises substantially PET, although other polyesters can also be used, particularly where they have a similar structure as PET, such as PET copolymers or the like. Where the recycled polyester is substantially PET and properly cleaned, up to about 75% by weight waste polyester can be incorporated into the final resin blend.

The recycled polyester is preferably substantially free of contaminants. Many sources of recycle are substantially clean and can be processed as received. Recycled polyester resin containing contaminants should be cleaned, such as by steam or other conventional cleaning processes and should have a minimum of contaminants. Contaminants generally arise where the virgin polyester originally packaged a material comprising a solvent which has permeated into the plastic; in such circumstances, conventional cleaning often cannot purge these contaminants which have permeated into the plastic. Hence recycled polyesters which have been used to contain water based materials are more preferred.

Functionalized Chain Extenders/Crosslinking Agents

The chain extendes or crosslinking agents in the present invention can be chosen from several classes of materials including; acid, epoxy and anhydride functionalized ethylene copolymers; partially neutralized ethylene methacrylic acid and acrylic acid copolymers; polyester thermoplastic elastomers; low molecular weight carboxylic acids, acid anhydrides, polyols, epoxies and other known viscosity enhancing components. These viscosity components can be incorporated up to about 20% by weight based on the weight of the recycle PET.

Other Resin Additives

Properties of the polyester compositions of the present invention can also be modified by incorporation of various conventional organic fillers, such as carbon black, silica gel, alumina, clays and chopped fiber glass. Improvement in light stability is possible by the addition of small mounts of pigments or the incorporation of a light stabilizer, such as ultraviolet light absorbers. Flame retardants, lubricants and extenders can also be added to the polyester blend compositions. An antioxidant may also be added to the blend to protect other organic polymers during repeated processing.

Also, tougheners can be added to the polyester blend compositions of the present invention to reduce fractures, cracking or the like. Tougheners can also enhance flexure properties and can be advantageous, depending upon the end use application. Useful tougheners for the invention include polyester elastomers, ethylene copolymer elastomers, ethylene methacrylic acid and ethylene acrylic acid copolymers, partially neutralized ethylene methacrylic acid or ethylene acrylic acid coplymers, acrylates and acrylate elastomers, terpolymers of ethylene butyl acrylate and glycidyl methacrylate and other polymers typically used to improve the impact resistance of polyesters. Plasticizers, fillers, pigments, barrier resins and the like can also be incorporated into the resin blends of the present invention.

Suitable blowing agents for the present invention include inert gasses, such as nitrogen and carbon dioxide, hydrocarbons boiling lower than about 40° C., such as propane, butane and pentane; hydrofluorocarbons such as difluoroethane and hydrochloro fluorocarbons; and gas liberating chemical blowing agents, such as sodium bicarbonate, a combination of citric acid and sodium bicarbonate, azo-dicarbonamid and various endothermic blowing agents which release $CO_2$. Mixtures of blowing agents can also be used. Blowing agents are used in mounts of about 0.1 to about 20% (by weight based upon the weight of the modified PET) to obtain the desired high expansion ratios. Concentrations of about 1 to 3 percent are typical.

In an alternative embodiment, it may be desirable to add 0.05% to 5% (by weight based upon PET) of a foam nucleating agent to the PET composition to promote foaming. Examples of typical such nucleating agents for enhancing foaming are fumed silica, silicates, mixtures of silicates, calcium carbonate, hydrogen carbonates, clay and small quantities of chemical blowing agents.

The polymers of this invention have excellent melt strength, melt viscosity, melt stability and may have (if desired) rapid hardening (and crystallization) rate.

Foam Process

Extrusion techniques common to those skilled in the art can be used to foam the PET resins of the present invention, preferably to densities less than 200 kg/m³. The modified PET resin can be pre-blended or dry blended with all desired additives, prior to being fed into an extruder hopper or all ingredients including the modified PET resin can be added to the extruder hopper separately through the use of additive feeders. Selected components can be preblended physically or as melt blends prior to incorporation into the remainder of the components.

In a typical foam extrusion process, the basic apparatus comprises a single extruder (preferably a length to diameter ratio of at least about 30:1 ), a liquid injection pump or gas cylinder with injector valves, a die to form the desired object, a cooling devise and a devise to collect the expanded, extruded product.

In such a process a two-stage screw is typically used but is not critically necessary. The PET resin blend and desired additives can be added to the extruder feed hopper and fed to the feed section of the screw. The PET resins are melted in the transition section of the screw and the blowing agent added either in the transition section of the screw or near the beginning of the metering section, if physical blowing agents are used.

The modified resin melt containing dissolved and/or dispersed blowing agent is metered by the screw to the die. Upon exiting the die the nucleated PET melt is expanded, optionally shaped, cooled and collected. The temperature profile on the extruder and die is adjusted to melt the modified PET in the extruder prior to the injection of the blowing agent and adequately cool tlle melt/blowing agent composition to allow for expansion without coalescence.

Another typical foam extrusion process employs two tandem extruders. In this process, the PET and other components are mixed, melted and the blowing agent injected in the first extruder. The melt/blowing agent composition is transferred by means of a conventional transfer tube or static mixer to the feed section of the second extruder which is used to transfer the melt blend to the die and to bring the melt temperature and pressure in the die to the values necessary for optimum foam formation. Typically the two extruders are of different sizes. The tandem extruder process allows for excellent control of process variables.

As is apparent to those of ordinary skill in the art, various screw configurations and designs typical for this application can be used to prepare the foamed or expanded, PET. Mixers can be added to the screw or as independent components to disperse additives, nucleants and blowing agents. Twin screw extruders can be used.

To optimize the utilization of viscosity enhancing components, viscosity enhancers (chain extenders and/or crosslinking agents) can be melt blended prior to being blended with the branched polyester. The recycle polyester can be melted in an extruder or other melt mixing device. The chain extender or cross linking agent can be added to the recycle polyester either in the initial feed or downstream in the process. A predetermined residence time and temperature is preferably maintained, and the preblended melt is preferably isolated in a useable form such as pellets, cubes, chips, etc. The preblended recycle polyester is then preferably processed with the branched polyester and remaining additives as described earlier.

Resulting Foamed Articles

Useful foamed articles which can be manufactured from the foams of the present invention (these articles can also be fabricated by resins of the present invention which do NOT include recycled plastic, since the inclusion of recycled polyester is an environmental issue, not a performance issue for the foamed resins of the present invention) include:

1. rigid foam insulation;
2. trays;
3. frozen food packages;
4. thermally insulating packages
5. packages for cook-in and reconstitutional microwaveable products;
6. organoleptic/aseptic packatges;
7. packages for hot fill;
8. oil resitant packages;
9. form-fill-seal microwaveable pouches;
10. clamshells, cups or robs;
11. conductive foam products;
12. amorphous and/or crystaline foam products;
13. foamed high oxygen or moisture barrier film;
14. labels;

What is claimed is:

1. A process for producing a polyester foam comprising the steps of:
   (a) melting a branched PET in an amount of at least 25% of the total composition, and having an intrinsic viscosity of about 0.65 to about 1.4 deciliters per gram, whereby the branched PET is derived from a diacid (or ester forming equivalent) and comprises about 1.5 to about 6.0 equivalents of a branching agent per 100 moles of diacid (or ester forming equivalent), the branching agent having a functionality of greater than 2 and a molecular weight of from about 50 to 5000 and a recycle PET resin having been cleaned and substantially free of a minimum of contaminants in an extruder;
   (b) incorporating a chain extender or a crosslinking agent to the melt stream either in the initial feed or downstream in the polymeric melt;
   (c) injecting a blowing agent into the melt stream; and
   (d) extruding the mixture to an area of low pressure, thereby facilitating the development of a stable closed cell foam structure.

2. A process in accordance with claim 1 wherein a nucleant is also added to the melt stream.

3. A process in accordance with claim 1 wherein the recycle polyester is preblended with the viscosity enhancing chain extenders or crosslinking agents.

* * * * *